United States Patent

Miura et al.

[11] Patent Number: 5,987,597
[45] Date of Patent: Nov. 16, 1999

[54] DATA PROCESSOR WITH EXECUTION CONTROL FOR FIRST AND SECOND EXECUTION UNITS

[75] Inventors: Hiroki Miura, Warabi; Yasuhito Koumura, Tokyo; Kenshi Matsumoto, Koshigaya, all of Japan

[73] Assignee: Sanyo Electric Co., Ltd., Moriguchi, Japan

[21] Appl. No.: 08/665,630

[22] Filed: Jun. 18, 1996

[30] Foreign Application Priority Data

Jun. 21, 1995 [JP] Japan .................................. 7-154695

[51] Int. Cl.$^6$ ...................................................... G06F 9/30
[52] U.S. Cl. ........................ 712/222; 712/225; 712/228
[58] Field of Search ................................... 395/563, 566, 395/569; 712/222, 225, 228

[56] References Cited

U.S. PATENT DOCUMENTS

| | | | |
|---|---|---|---|
| 4,706,211 | 11/1987 | Yamazaki et al. | 364/760 |
| 5,019,966 | 5/1991 | Saito et al. | 364/200 |
| 5,222,240 | 6/1993 | Patel | 395/775 |
| 5,499,350 | 3/1996 | Uchida et al. | 395/376 |
| 5,524,211 | 6/1996 | Woods et al. | 395/200.3 |
| 5,574,939 | 11/1996 | Keckler et al. | 395/800 |
| 5,594,679 | 1/1997 | Iwata | 364/736 |
| 5,664,114 | 9/1997 | Krech, Jr. et al. | 395/200.64 |
| 5,684,983 | 11/1997 | Ando | 395/566 |
| 5,694,565 | 12/1997 | Kahle et al. | 395/392 |
| 5,694,588 | 12/1997 | Ohara et al. | 395/566 |

OTHER PUBLICATIONS

Nihon Denki Corp.—User's Manual μPD77240; Digital Signal Processor; Sep. 1991: p. 66 with English Abstract.

*Primary Examiner*—Zarni Maung
*Assistant Examiner*—Saleh Najjar
*Attorney, Agent, or Firm*—Armstrong, Westerman, Hattori, Mcleland, & Naughton

[57] ABSTRACT

An instruction fetcher reads out instructions and data from a memory. The instructions and data are decoded by an instruction decoder. When a data transfer instruction is fed to an input register in a register section, a second execution unit starts an execution, the execution result being then stored in an output register. If any unprocessed data remains in the input or output register, the subsequent data processing is suspended. Input and output register sets and execution sub-units may be provided such that any of these components can be selected depending on the necessary process. Since a given execution is executed by the data transfer instruction, the data can be processed at high speed through a simplified program. Since no specific and additional computation instruction is required, the expandability can be improved.

17 Claims, 11 Drawing Sheets

| ADD WR0, RAM0 | MOV WR1, WR2 | INCRP; |
|---|---|---|
| OPERATION INSTRUCTION | TRANSFER INSTRUCTION | CNT FIELD INSTRUCTION (INTERNAL STATE INDICATION) |

DATA PROCESSOR WITH EXECUTION CONTROL FOR FIRST AND SECOND EXECUTION UNITS

BACKGROUND OF THE INVENTION

1. Field of the Invention

The present invention relates to a data processor for executing various instructions to process data.

2. Description of the Prior Art

There are many data processors of a control driven type in which instructions stored in a memory are sequentially fetched and decoded for execution. Microprocessors are examples of such processors.

FIG. 1 is a flow diagram of a RISC (reduced instruction set computer) type processor. This processor comprises a memory 1, an instruction fetcher 2, an instruction decoder 3, a register section 4 having a plurality of registers, an execution unit 5 and a data access section 6. In such an arrangement, computation, data transfer (load/store) and other instructions are sequentially fetched and decoded, the decoded instructions being then used by the execution unit 5 for executing operations according to the instruction codes.

In the prior art, the execution unit 5 of FIG. 1 includes a basic arithmetic logic unit (ALU) for executing addition, subtraction, logical or, logical and, and other operations, and additionally has a parallel multiplier for executing multiplication at a high speed, for example. The execution unit 5 may include two types of ALU for integer number arithmetic and for floating-point arithmetic. When data is to be processed through various execution sub-units forming the execution unit 5, an operation code corresponding to each of the sub-units is generally provided and described in a program. These operation codes are then read in the processor. More particularly, extended operation codes for MUL (multiplication), DIV (division), MAC (sum of products), FADD (floating-point addition), FSUB (floating-point subtraction) and others may be provided in addition to basic operation codes for ADD (integer addition), SUB (integer subtraction), AND (logical or), OR (logical and) and others. These operation codes were described in the program.

However, such a processor can perform a given operation only when it executes an instruction for providing data required by the operation to an operation data storage location (e.g., a register) and another instruction for starting the actual operation. For example, if the RISC processor is to perform repeated multiplications for operand data stored in the memory, the following program may be considered:

| LD  | R2, (R0) | (R2 ← mem (R0)) |
| LD  | R3, (R1) | (R3 ← mem (R1)) |
| MUL | R2, R3   | (R2 ← R2 × R3). |

In such a program, two load instructions for transferring data to two registers (R2 and R3) and a multiplication instruction are necessary. One multiplication requires the execution of at least three instructions.

This raises the following problems:

(Problem 1) Limitation of Processing Performance

Even if the processor includes a high-speed computing element for executing the operation within one instruction cycle, the overall processing rate will only just perform one operation through three instruction cycles. This hampers the improvement of performance.

(Problem 2) Program Size

The overall program size is large because the number of instructions necessary to perform the operation is large.

(Problem 3) Instruction Code Length

When a new operation is to be added, the operation code indicative of how it is to be processed must be added into the instruction code. The extended operation directly results in an increase of the instruction code length. This makes the problem 2 more significant. The hardware of the processor will also be increased in scale.

(Problem 4) Difficulty in Compactly Designing Instructions

Operations other than the basic operations may be added and extended in the future. These operations must be previously reserved in the processor. It is thus difficult to compactly design the instruction code.

(Problem 5) Future Extension

When all the future additions and extensions of the operations are considered, the design itself becomes difficult. The number of additional operations is consequently limited. It is thus very difficult to design a flexible processor facilitating extension.

To overcome some of these problems, there has been proposed μPD77240 which is a DSP from NIHON DENKI CORP. The features of the DSP are described in "User's Manual μPD77240", on page 66.

(1) This DSP has a circuit for performing the floating-point multiplication (FMPY) in addition to the conventional ALU. The ALU starts the operation based on an explicit operation instruction (ADD, SUB or the like) while the FMPY circuit automatically starts the operation for data transferred by a data transfer instruction.

(2) In the FMPY, data transferred to two multiplication input registers K and L are multiplied together. The result is outputted to the output bus of the FMPY after one instruction cycle and written into a multiplication output register M after two instruction cycles.

As is shown, the multiplication can only be started by the data transfer instruction. This overcomes the above problems 1 and 2 to some extent.

However, the DSP still includes the following problems.
1. As to the Problems 1 and 2

FIG. 2 shows the structure of a field for specific instructions in the DSP. This field is one included in generally called "operation instruction" in said manual on page 14. The synopsis of the field is as follows:

1. The instruction code length is 32 bits.
2. OP indicates the type of operations.
3. CNT instructs to change the internal state of the DSP, for example, an increment in an address register.
4. Q and P represent first and second operands, respectively.
5. SRC and DST indicate source and destination for the transfer instruction, respectively.

More particularly, three different instructions, operation, transfer and internal state manipulation, hereinafter referred to as "individual instructions" are usually described together in the 32-bit fixed instruction (see the bottom of the drawing). This is because many DSP's follow the architecture of the microprogram computer. As a result, the total number of steps can be reduced at the sacrifice of shortening the instruction code length. When the number of bits required to describe an individual instruction is appropriately combined with that required to describe other individual instructions, these instructions can be completely accomodated in the 32-bit instruction. Such an architecture may overcome the problems 1 and 2.

When the actual programing is considered, however, the technique cannot improve the problems 1 and 2 very much.

This is because if the efficiency is to be maximized, it is always required to set three parallel-describable instructions, which is actually impossible. If only several transfer instructions are to be continuously executed, for example, it requires a 32-bit instruction code for each transfer instruction since only the fields of the SRC and DST used (with total 10 bits). During such a period, the efficiency of usage in the memory will be reduced to about one-third, and the problems 1 and 2 will be raised again.

2. As to the Problems 3 to 5

In this DSP, the FMPY can only perform the multiplication. If any other operation is added for the FMPY in the future, an operation selection mechanism must be also incorporated in a suitable manner. In the structure of FIG. 2, the a selection can be carried out by adding a new individual instruction to the OP. However, such a manner is hardly acceptable because it conflicts with the basic design concept of the FMPY in which the multiplication is only executed by the individual instructions relating to the data transfer. This may also directly raise the problems 3 to 5. It is to be noted that the DSP is not initially designed to overcome the problems 3 to 5.

The relationship between the problems 1 to 5 and the DSP has been now described. When the RISC processor, which is one of the main applications of the present invention, is considered, the DSP may further raise the following problems.

[Problem 6] Difficulty in Programing

In the FMPY, the multiplication is carried out for the registers K and L at all times. The result of multiplication activated two cycles earlier appears in the register M. Since the result is updated for each cycle with or without reference from outside, a programmer must pay carefully attention to timing when a desired result is read out from the register M. On the other hand, if a high level language is to be used, it is extremely difficult to develop a compiler for attaining the read-out timing intended by the programmer.

Even if the problem of timing is overcome, another problem will be raised when an interruption occurs before reading out the result of computation. This is because the multiplication result will be lost until the interruption has been processed. Although another method by which the interruption is inhibited before the multiplication is considered, it is not practical for reasons (1) the program becomes complicated; (2) the inhibition and permission of interruption should be judged at the system level; and (3) the immediacy intended by the FMPY is lost.

[Problem 7] Restriction due to Architecture

The DSP only has three registers K, L and M and is combined with the FMPY as a set. If a new operation (e.g., addition) is to be added, any other register for such a new operation (e.g., $K_2$, $L_2$ or $M_2$) must be added to the DSP. Since the RISC processor requires various operations such as addition, subtraction, multiplication, division, trigonometric function and others for performing scientific and technical computations such as image processing, CG and the like, the scale of the hardware will be significantly increased when a 32-bit register set is added for each of these operations.

[Problem 8] Hardware Volume

The DSP works at high speed by simultaneously transferring the data to the registers K and L. Thus, the DSP takes a double 32-bit data bus structure at the entries of these registers. This makes the hardware complicated, thereby leading to increase of the circuit scale. It is desirable to improve such an arrangement from the viewpoint of compact design and manufacturing cost.

SUMMARY OF THE INVENTION

It is therefore an object of the present invention to provide a data processor which can overcome not only the general problems 1 to 5, but also the problems 6 to 8 in the described DSP.

To this end, the present invention provides a data processor comprising first execution unit responsive to an operation instruction for starting a given execution, a plurality of registers including input and output registers, each being accessible by a data transfer instruction, second execution unit responsive to a data transfer instruction for starting a given execution when data has been transferred to the input register, the computed result data being then written into said output register, and write suspend means for temporarily suspending the write of subsequent execution result data into the output register until the data residing therein has been read out therefrom.

According to the data processor of the present invention, a given computation is started when an operation instruction is executed in the first execution unit. On the other hand, when the data is transferred to the input register by executing a data transfer instruction, the second execution unit starts a given computation for the transferred data. The computed result data is then written into the output register. At this time, writing of the subsequently computed result data into the output register is delayed until the first mentioned data has been read out from the output register.

According to the data processor of the present invention, the data can be processed through less cycles since the computation is started in the second execution unit when the data transfer instruction is executed. This improves the performance and reduces the size of the program. Since the subsequently computed result data is delayed from being written into the output register until the computed result data has been read out from the output register, the program or compiler can be more easily designed. Even when operation functions are newly added or extended, no operation instructions are required since the added or extended functions are started by the normal data transfer instruction. Therefore, the instruction code size and hardware scale can be prevented from being increased.

The present invention includes read-out suspend means for suspending readout of the computed result data from the output register until the computed result data is written thereinto.

In this configuration, the computed result data is delayed from being read out from the output register through execution of the instruction until a desired computed result data has been written into the output register. This similarly facilitates the programing or the like.

The present invention includes execution suspend means for suspending the second execution unit from starting the execution when the write is being suspended by the write suspend means and data is transferred to the input register.

In this configuration, the second execution unit is delayed from starting the computation when the write is delayed and if data is transferred to the input register. This also accomplishes the same object.

The present invention includes transfer suspend means for suspending transfer of data to the input register through execution of a subsequent data transfer instruction when a valid data is held in the input register.

In this configuration, the transfer of data to the input register through execution of the subsequent data transfer instruction is delayed when valid data is held in the input register. This also accomplishes the same object.

The present invention includes a plurality of register sets formed from combinations of the input and output registers and designation means for selecting a register set to be used in the execution from the plurality of register sets.

In this configuration, any of the register sets can be selected for use. This can smoothen interrupt handling, for example.

The second execution unit may have a plurality of execution sub-units each performing a different execution. The data processor of the present invention further comprises designation means for selecting an execution sub-unit to be activated from the plurality of execution sub-units when the data is transfer thereinto.

In this configuration, an execution sub-unit to be actually used is selected from the plurality of execution sub-units when the data transfer is made. The information for selection contents is not required to be reflected to the instruction code. Therefore, the instruction code size can be reduced and flexibility can be provided for a future functional extension.

The second execution unit may have a plurality of execution sub-units each performing a different execution. The data processor of the present invention has means for inputting the computed result data from one of the execution sub-units into another execution sub-unit, means for inputting the data written in the output register into said another execution sub-unit and means for recursively inputting the computed result data of said another execution sub-unit into the output register.

In this configuration, a further form is adapted to input the computed result data from one of the execution sub-units into another execution sub-unit, to input the data written in the output register into the other execution sub-unit and to recursively input the computed result data of the other execution sub-unit into the output register.

Therefore, a plurality of operations can be continuously carried out. As a result, for example, a sum of products or the like can be continuously executed at high speed.

The present invention includes a plurality of input registers, detection means for detecting a timing at which all data required by one execution are inputted into the input registers when the data are sequentially transferred to the plurality of input registers, and execution suspend means for suspending the second execution unit from starting the execution until all the data are inputted into the input registers.

In this configuration, the second execution unit is delayed from starting the execution until all the data required have been inputted into the input registers. This facilitates the programing. Further, no hardware for simultaneously transferring the data to the input registers is required. Thus, the hardware can be reduced in scale.

In this manner, all the problems in the prior art can be overcome by the present invention.

DETAILED DESCRIPTION OF THE PREFERRED EMBODIMENTS

Some preferred embodiments of the present invention will now be described with reference to the drawings.

First Embodiment

Figure 1:
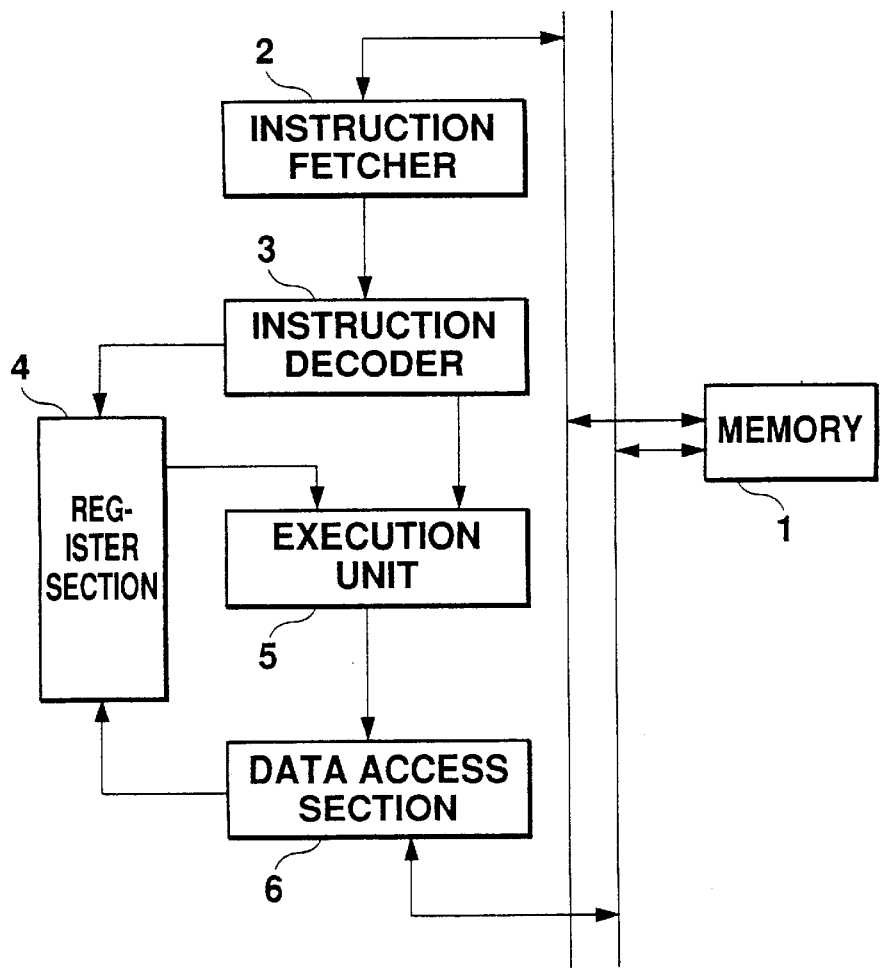
FIG. 1 is a block diagram of an RISC type processor.

A data processor of the present invention starts execution in an execution unit as shown in FIG. 1 by an operation instruction and starts execution in a new execution unit (which will be referred to "second execution unit") only as a result of a data transfer instruction for a specified register.

Figure 3:
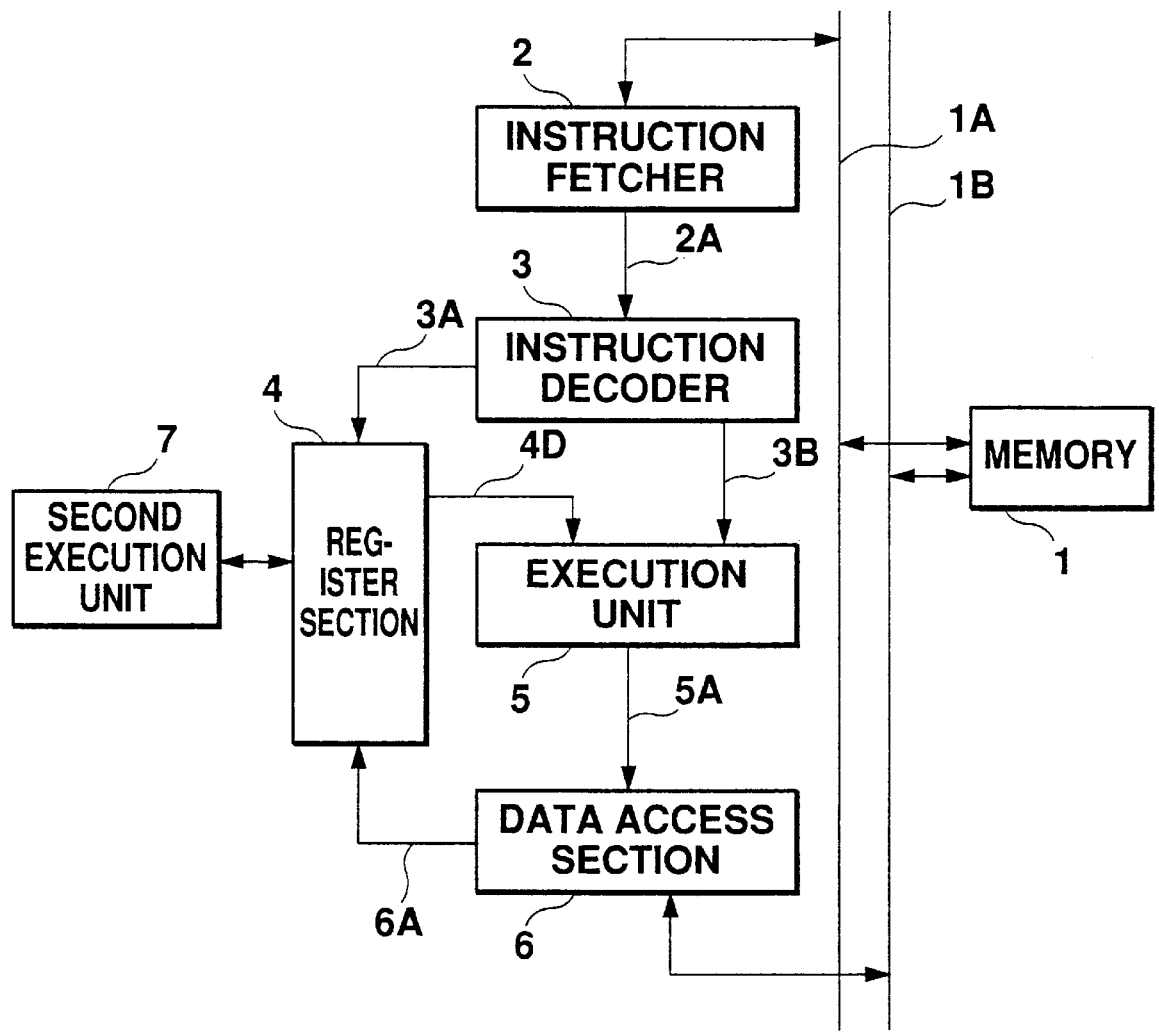
FIG. 3 is an overall block diagram of a data processor constructed in accordance with a first embodiment of the present invention.

FIG. 3 is an overall block diagram of the data processor according to the first embodiment.

Referring to FIG. 3, instructions and data have been stored in a memory 1. The instructions are accessed via an instruction bus 1A while the data are accessed via a data bus 1B. An instruction fetcher 2 sequentially fetches various instructions such as data transfer, operation and other instructions from the memory 1, the fetched instructions being then delivered to an instruction decoder 3 through a signal line 2A.

The instruction decoder 3 divides an instruction code into predetermined fields according to the type of the instruction and extracts an OP indicating the type of an operation to be processed, an immediate operand embedded in the instruction code, a source register number, a destination register number and the like. The operation (OP) is fed to the execution unit 5 through a signal line 3A. The register section 4 is accessed through a signal line 3A.

Data residing in a register specified by the source register number is read out from the register section 4 and fed to the execution unit 5 through a signal line 4D. When the operation (OP) indicates an operation such as addition or subtraction, the conventional computation is carried out for a source operand by the execution unit 5. The execution result is fed to a data access section 6 through a signal line 5A and then written back to a register specified by the destination register number in the register section 4 through a signal line 6A.

On the other hand, when the operation is to store data to the memory, the data is written into the memory 1 through the data bus 1B according to the data address and write data generated by the execution unit 5. When the operation is to load data, the data residing in the memory 1 is read out and written into the specified register in the register section 4 according to the data address generated by the execution unit 5.

This an arrangement is similar to the prior art. However, the first embodiment is characterized by the fact that it also includes a second execution unit 7 connected to the register section 4.

Figure 4:
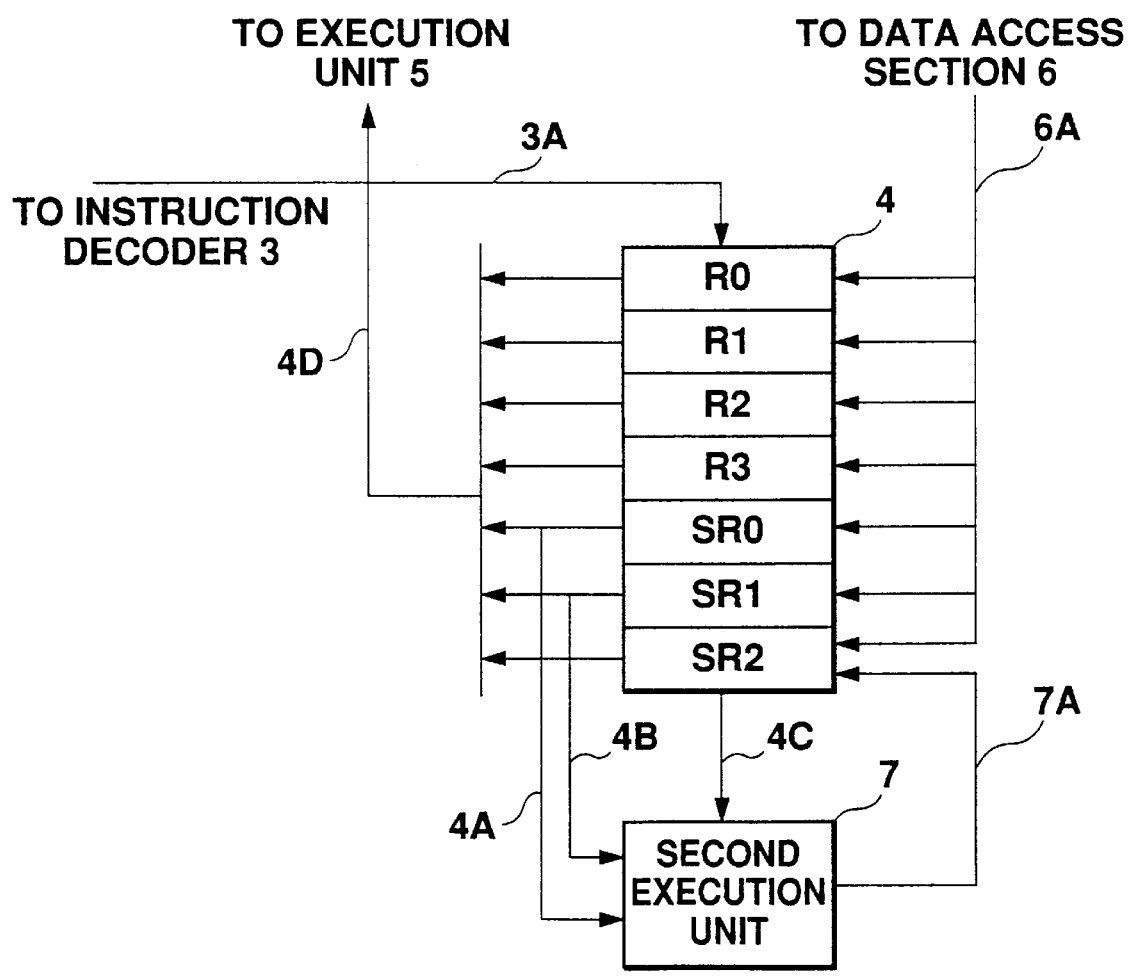
FIG. 4 is a view showing a register section 4 and a second computing section 7 in FIG. 3.

FIG. 4 is a view showing the connection between the register section 4 and the second execution unit 7 in FIG. 3.

In FIG. 4, R0–3 and SR0–2 designate work registers which are accessed by data transfer instructions such as load, store and other instructions. R0–3 are general-purpose work registers and SR0–2 are data registers which can be used by the second execution unit 7. The registers SR0, SR1 and SR2 are connected to the second execution unit 7 through data lines 4A, 4B and 7A, respectively. The second execution unit 7 also receives an output data existence flag, which will be described later, from the register SR2 through a signal line 4C. In this embodiment, the registers SR0 and SR1 are used to store input data to the second execution unit 7 while the register SR2 is used to store output data from the second execution unit 7.

Figure 5:
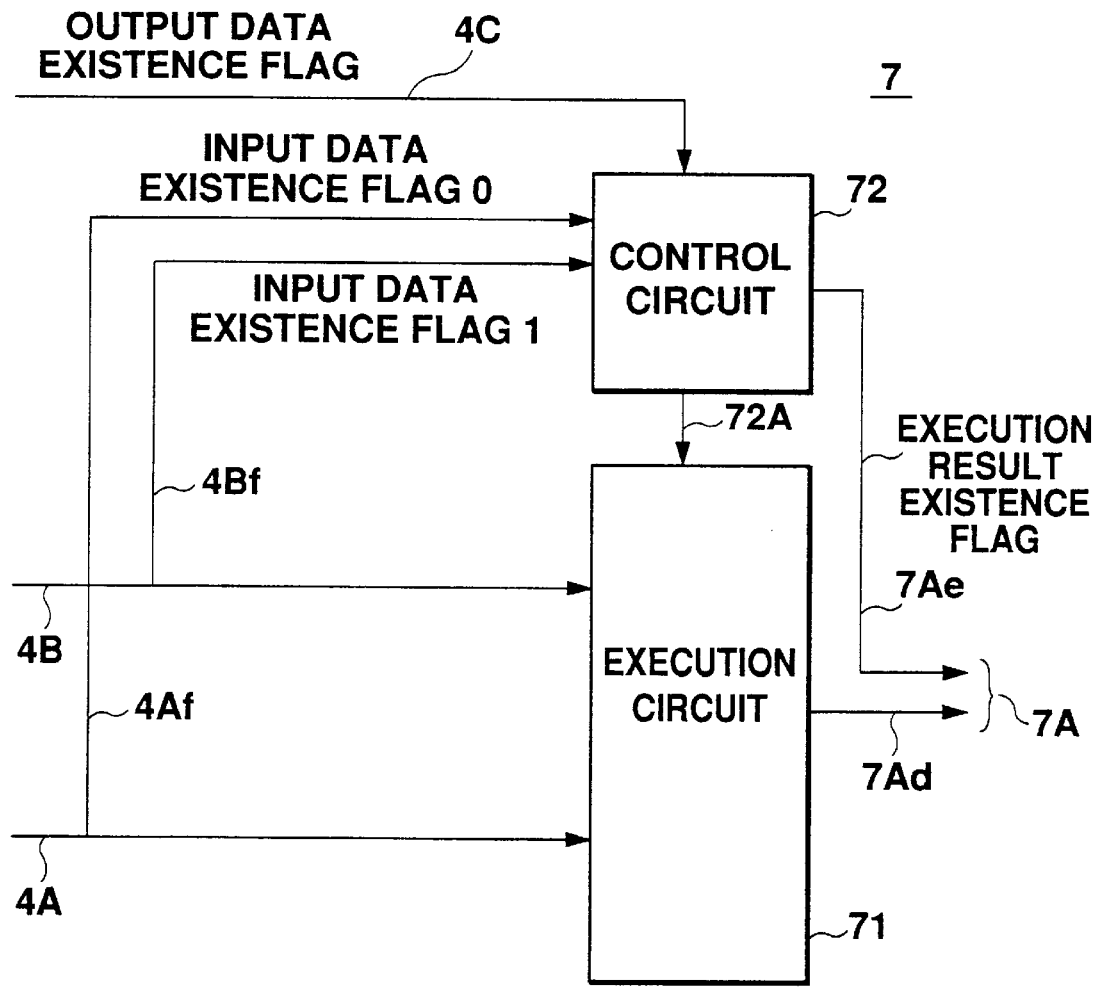
FIG. 5 is an internal block diagram of the second execution unit 7 in the first embodiment.

FIG. 5 is an internal block diagram of the second execution unit 7. As shown, the second execution unit 7 comprises an execution circuit 71 for performing the actual computation and a control circuit 72 for controlling the execution circuit 71. The execution circuit 71 is of two-input and one-output type and performs multiplication and division, for example. In FIG. 5, input data existence flags 0 and 1 indicate whether or not a data to be processed exists in the registers SR0 and SR1 When a data exists, each of the input data existence flags is brought into its set state. When there is no data, each of the input data existence flags are reset. These flags are connected to the control circuit 72 through signal lines 4Af and 4Bf.

The data read out from the registers SR0 and SR1 are provided to the execution circuit 71. If the execution circuit 71 produces an effective execution result, the control circuit 72 sets an execution result existence flag which is in turn outputted toward a signal line 7Ae. The execution circuit 71 outputs the execution result data toward a data line 7Ad. These data are then provided to the register SR2 through a data line 7A which is formed by the signal line 7Ae and the data line 7Ad. The control circuit 72 permits the execution circuit 71 to start the computation through a control line 72A.

The data processing procedure characterized by this embodiment will now be described with reference to FIGS. 3 to 5.

1. Data Load to SR0

It is first assumed that an instruction of "load data from the memory to the register SR0" is fetched. The data is read out from the memory and loaded into the register SR0 through a data line 6A. The input data existence flag 0 is set. The data are provided to the execution circuit 71.

2. Data Load to SR1

If an instruction of "load data from the memory to the register SR1" is fetched, data are similarly read out from the memory and then loaded into the register SR1. The input data existence flag 1 is also set and the data are provided to the execution circuit 71.

3. Execution Activation

After the control circuit 72 has confirmed that both the input data existence flags 0 and 1 are in their set state, the control circuit 72 provides an execution start instruction to the execution circuit 71 through a control line 72A. The execution circuit 71 responds to this instruction for starting the execution.

4. Storing Execution Result to SR2

The control circuit 72 sets an execution result existence flag after the lapse of a time required for execution in the execution circuit 71. The execution result data and this flag are provided to the register SR2 through the data line 7A.

The register SR2 has an output data existence flag, that is, a flag indicating whether or not execution result data exists in the register SR2. This flag has been reset at its initial state. Only when the output data existence flag is reset, the execution result is permitted to be written into the register SR2. The flag is set after the write. When the output data existence flag is set, the execution result existence flag is reset.

5. Storing Data from SR2 to Memory

When an instruction "store data from SR2 to the memory" is thereafter fetched, the register SR2 is read out through the data line 4D and the output data existence flag is again reset.

A series of processing steps have been described. Subsequently, the control circuit 72 similarly feeds a computation start instruction to the execution circuit 71 each time it is detected that both the input data existence flags 0 and 1 are set. When the execution is completed, the execution result existence flag is set. If the output data existence flag is still set when the execution result existence flag is set, however, the execution result is suspended from being written into the register SR2.

If the execution result existence flag is set, and when the writing to the register SR2 is suspended, the control circuit 72 suspends a computation start instruction from being issued to the execution circuit 71.

In this arrangement, a programmer or compiler need not carefully attend to the timing at which given data is read out. More particularly, this embodiment can perform a further processing step only when it is confirmed that the necessary data is provided at the necessary place. Even if the instruction of reading out the execution result is executed at any timing or even if an instruction of setting the input data is performed at any timing, the process can be properly carried out. This can overcome the above problem 6 in the prior art.

In this embodiment, the computation in the execution unit 5 is started by the operation instruction as in the prior art. On the other hand, the computation in the second execution unit 7 is started only by the data transfer instruction to the registers SR0 and SR1. If the execution circuit 71 is a multiplier and when the multiplication is repeatedly executed for different operand data stored in the memory, the following program may be proposed, for example. The program only requires two instructions for one multiplication. This can improve the processing speed and reduce the program size.

```
LD SR0, (R0)   (SR0 ← mem (R0))
LD SR1, (R1)   (SR1 ← mem (R1)) Multiplication Start
```

Another processing method may be considered in which one-dimensional data arrays (i.e., data streams) stored in the memory are multiplied by one another to form products. The resulting one-dimensional array is stored in the memory. This method may be frequently executed for a broad range of field such as audio processing, image processing and others. In this embodiment, the second execution unit 7 is used for multiplication while the execution unit 5 is used for array address computation. A program will be shown below.

```
LD    SR0, (R0++)   (SR0 ← mem (R0), R0 ← R0+1)
LD    SR1, (R1)     (SR1 ← mem (R1)) Multiplication Start
ADD   R1, 8         (R1 ← R1+8)  Parallel Execution of
                                  Addition and Multiplication
ST    SR2, (R2++)   (mem (R2) ← SR2, R2 ← R2+1)
```

In this program, the numeral "8" on the third line is a shift to be provided to a pointer R1. The multiplication is started in the second execution unit 7 by execution of a load instruction on the second line. The addition is started in the execution unit 5 by execution of an addition instruction on the third line, thereby executing the addition and multiplication in parallel at the same time. Thereafter, the multiplied result written in the register SR2 is stored in the memory through a store instruction. If this program is executed by the conventional RISC processor, it requires a multiplication instruction (MUL). This is disadvantageous from the viewpoint of processing speed and program size.

As will be appreciated from the foregoing, that this embodiment can overcome not only the problem 6, but also the problems 1 and 2 in the prior art.

In this embodiment, the second execution unit 7 is of two-input type in which the computation is started when it is detected that two data are written into the registers SR0 and SR1. However, the embodiment is so modified that when data is written into the register SR0, the input data existence flag 0 is not outputted and that when data is written into the register SR1, the input data existence flags 0 and 1 are simultaneously outputted. In such a case, when a constant data has been stored in the register SR0, the computation can be repeatedly carried out by continuously executing only the load instruction to the register SR1. This embodiment can also overcome the problem 13 in the prior art.

Second Embodiment

The second embodiment provided by modifying the first embodiment will be described. In the arrangement of the first embodiment, the readingout from the register SR2 becomes an obstruction when the load instructions to the registers SR0 and SR1 are continuously executed. This may be a cause to suspend the overall computing process. The second embodiment can avoid a reduction of performance.

Figure 6:
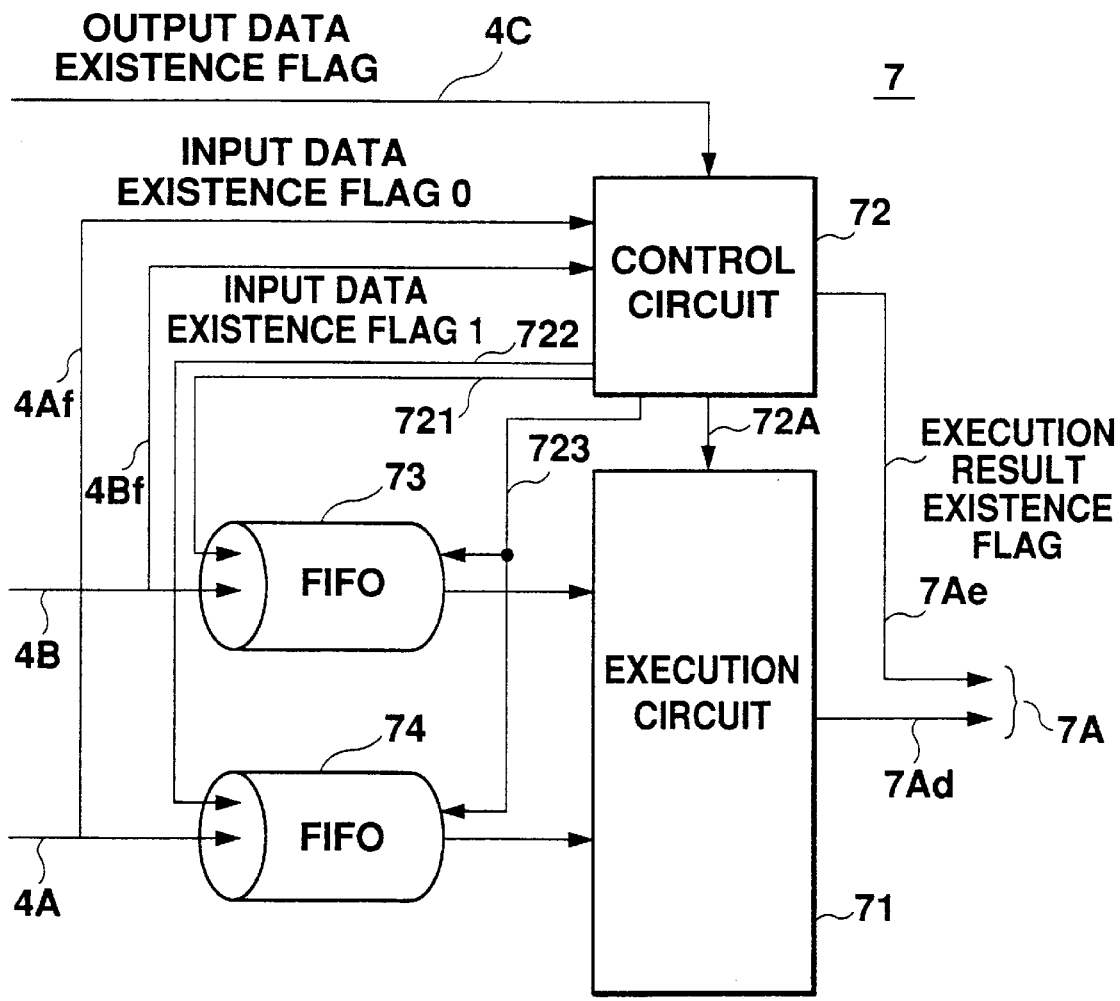
FIG. 6 is an internal block diagram of a second execution unit 7 according to a second embodiment.
Figure 7:
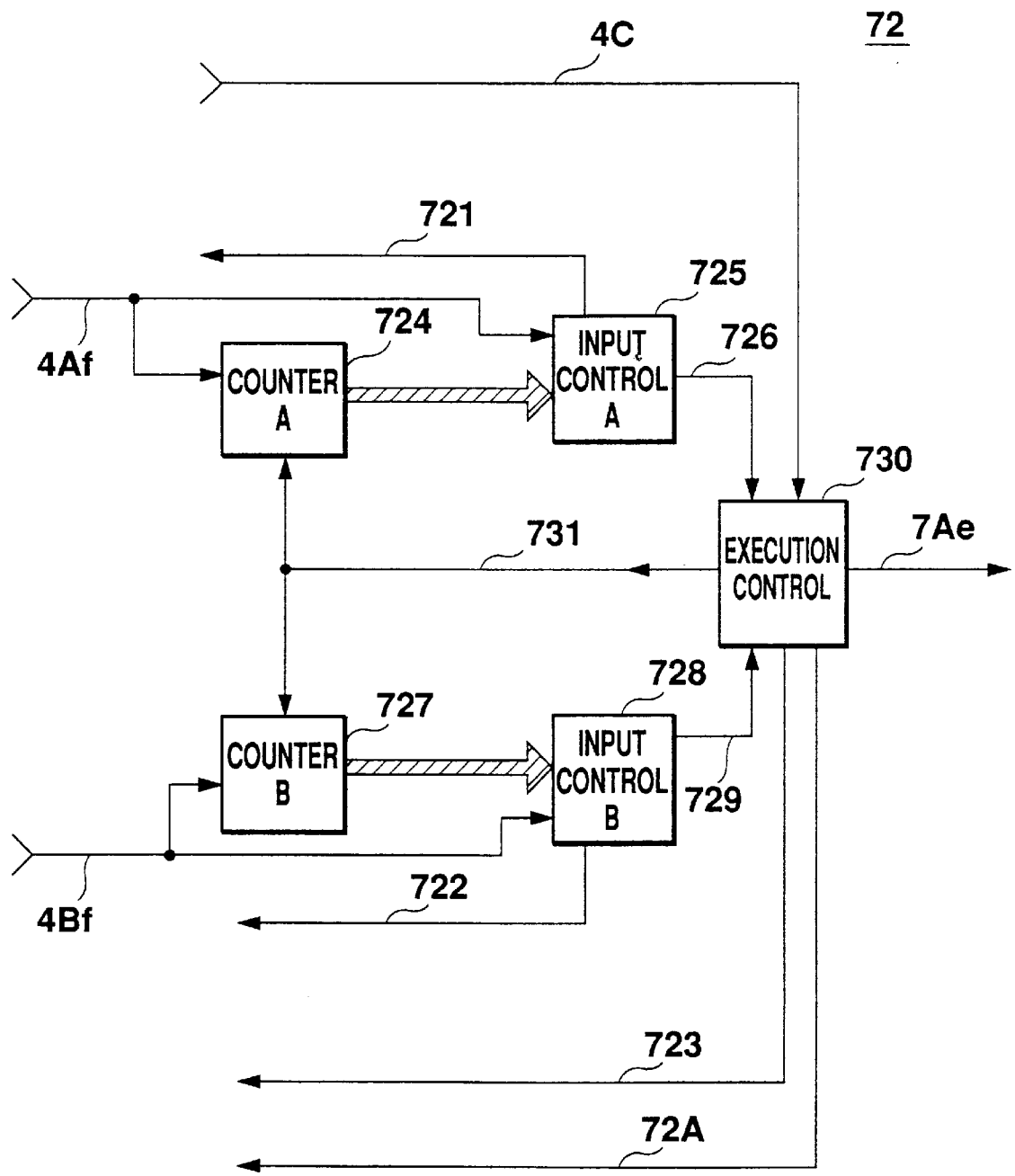
FIG. 7 is an internal block diagram of a control circuit 72 in FIG. 6.

FIG. 6 is an internal block diagram of the second execution unit 7 in the second embodiment while FIG. 7 is an internal block diagram of a control circuit 72 shown in FIG. 6. The other parts may be similar to those of the first embodiment. Therefore, only differences therebetween will be described below.

The second embodiment is characterized by that the execution circuit 71 includes two inputs each having a FIFO (first-in, first-out) memory 73 or 74 through which data can be continuously written into the resisters SR0 and SR1. As shown in FIG. 6, the FIFO memories 73 and 74 are controlled by write signals 721, 722 and a read signal 723 from the control circuit 72. The control circuit 72 comprises the following components as shown in FIG. 7.

(1) Counters A724, B727

They are adapted to count the number of data stored in the FIFO memories 73 and 74, respectively. The counters A724 and B727 have their initial output equal to zero. Each time the input data existence flags 0 and 1 are set, the counter A724 and B727 are counted up by signal lines 4Af and 4Bf and counted down by a count-down signal 731.

(2) Input Control Circuit A725

When the input data existence flag 0 is set and if the amount of data indicated by the counter A 724 is less than the maximum capacity of the FIFO memory 73, the input control circuit A725 outputs the write signal 721 to the FIFO memory 73 into which the data from the register SR0 is then written. The input control circuit A 725 always outputs a read-out request signal 726 as long as the amount of data indicated by the counter A 724 is not equal to zero.

(3) Input Control Circuit B728

The input control circuit B728 controls the FIFO memory 74 in the same manner as in the input control circuit A725. More particularly, when the input data existence flag 1 is set and if the amount of data indicated by the counter B727 is less than the maximum capacity of the FIFO memory 74, the input control circuit B728 outputs the write signal 722 into which the data from the register SR1 is then written. The input control circuit B728 always outputs a read-out request signal 729 as long as the amount of data indicated by the counter B727 is not equal to zero.

(4) Execution Control Circuit 730

When both the read-out request signals 726 and 729 are outputted, the execution control circuit 730 judges that two data to be computed are stored in the registers. When the two data are inputted into the registers and if the execution result existence flag of FIG. 6 is in its reset state, the execution control circuit 730 simultaneously outputs the read signal 723 toward the FIFO memories 73 and 74 from which the two data are then read out. The read data are provided to the execution circuit 71. At the same time, the execution circuit 71 is permitted to start the execution through a control line 72A. The execution control circuit 730 further outputs the count-down signal 731 toward the counters A724 and B727.

The synopsis of the second embodiment has been described. In this arrangement, data input can be continuously performed. Therefore, the execution performance will be improved. This provides a solution for the problem 1 in the prior art while overcoming the problem 6. Since it is not required that the data are simultaneously inputted into the registers SR0 and SR1, the problem 8 can also be solved by the second embodiment. If it is assumed, for example, that the products of one-dimensional arrays are summed as described in connection with the first embodiment, the system can be programmed such that two data streams can be asynchronously fed into the separate registers and that each of the two data streams can be asynchronously read out from one of the registers. This can also reduce the processing time. This feature is very advantageous in a complicated scientific computation.

Third Embodiment

The third embodiment of the present invention which is modified from the first embodiment will now be described.

Figure 8:
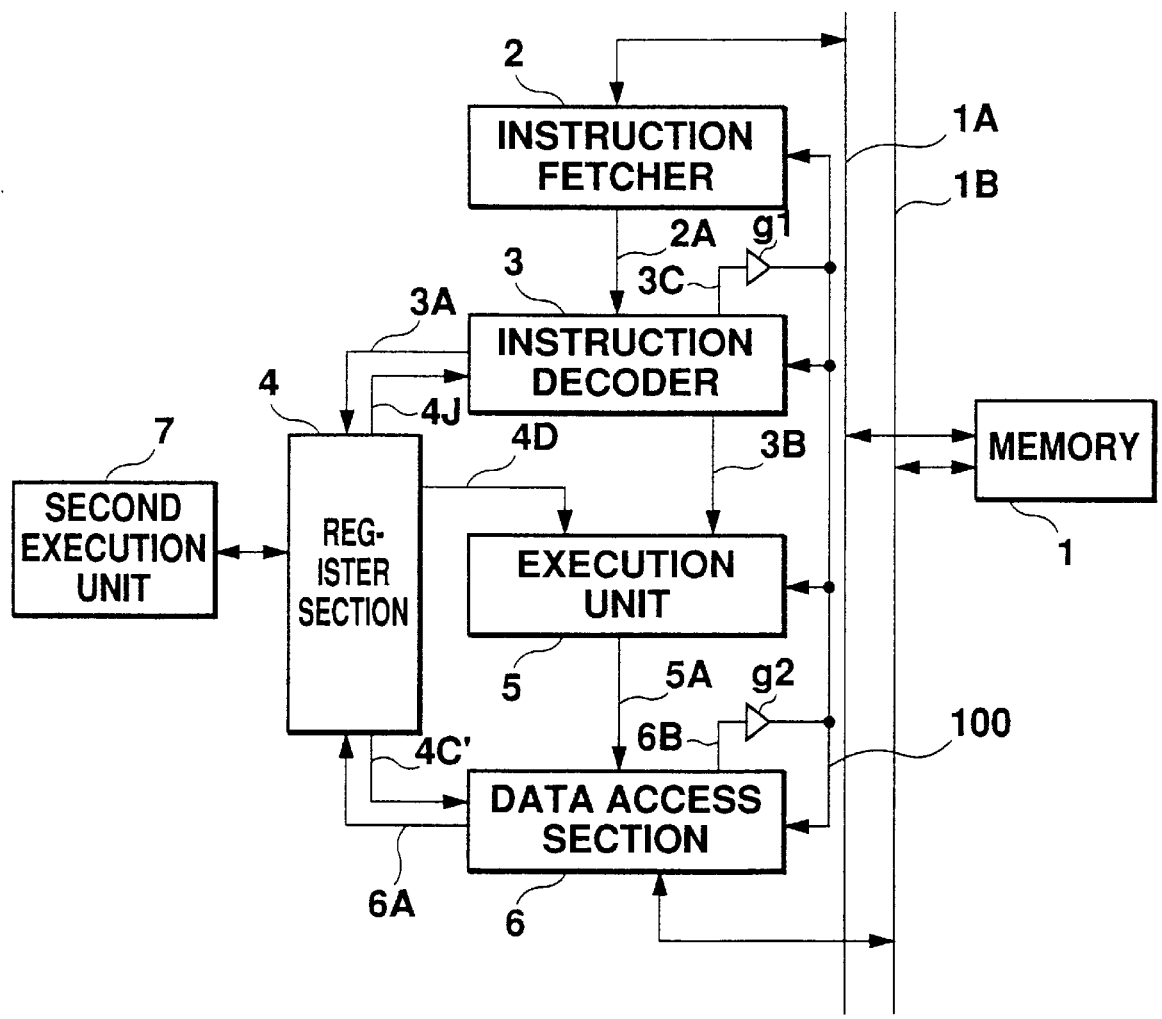
FIG. 8 is an overall block diagram of a data processor according to a third embodiment of the present invention.
Figure 9:
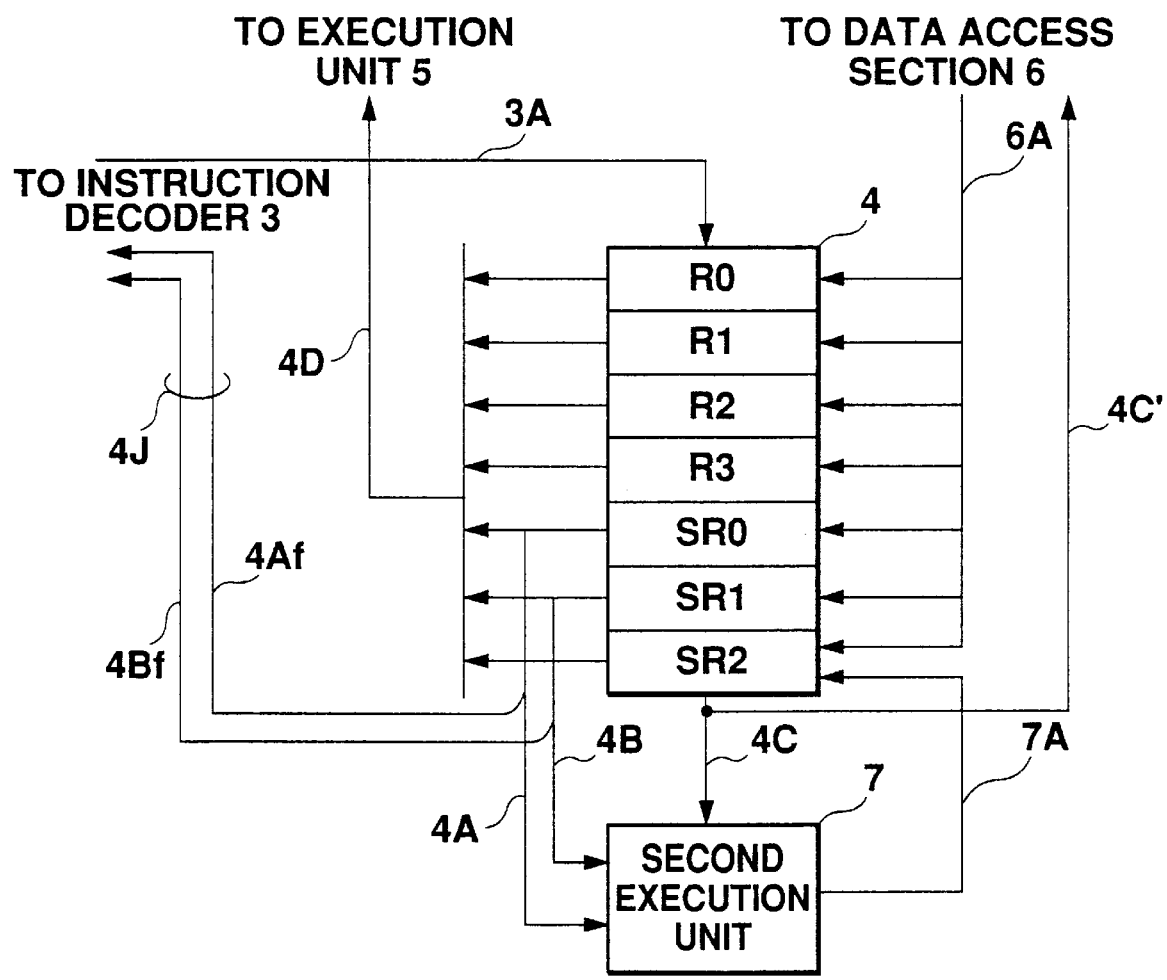
FIG. 9 is a view showing a register section 4 and a second execution unit 7 in FIG. 8.

FIG. 8 is an overall block diagram of a data processor according to the third embodiment while FIG. 9 is a view showing the connection between the register section 4 and the second execution unit 7. FIGS. 8 and 9 correspond to FIGS. 3 and 4, respectively. Parts similar to those of the first embodiment and their functions will not be further described.

New components in the third embodiment are:

(1) A signal line 4C' for transmitting the state of the output data existence flag to the data access section 6;

(2) Signal lines 4J for transmitting the states of the input data existence flags 0 and 1 to the instruction decoder 3 (the signal lines 4Af and 4Bf being collectively called "signal lines 4J");

(3) Suspend request signals 3C and 6B for suspending pipeline process in this system;

(4) Open-drain type gates g1 and g2 for creating a wired OR function of the suspend request signals 3C and 6B; and (5) Suspend signal 100 resulting from the wired OR.

The functional features of these components are as follows:

1. When the read-out instruction for the register SR2 is executed and if the output data existence flag is not in its set state, the data access section 6 outputs the suspend request signal 6B which in turn causes the suspend signal 100 to be outputted through the gate g2. As a result, the processor will be brought into its waiting state. 2. If the input data existence flag 0 is set when the data write instruction for the register SR0 is to be executed or if the input data existence flag 1 is in its set state when the data write instruction for the register SR1 is to be executed, the instruction decoder 3 outputs the suspend request signal 3C which in turn causes the suspend signal 100 to be outputted through the gate g1. As a result, the data processor will be brought into its waiting state.

The synopsis of the third embodiment has been described above. According to the third embodiment, there is no limitation for the timing when the execution result is read out as in the prior art, since the pipeline process itself in the system is suspended, if necessary. As a result, the third embodiment can basically overcome the aforementioned problem 6. It is also desirable in the third embodiment that the performance is improved in the same manner as in the second embodiment.

Fourth Embodiment

Figure 10:
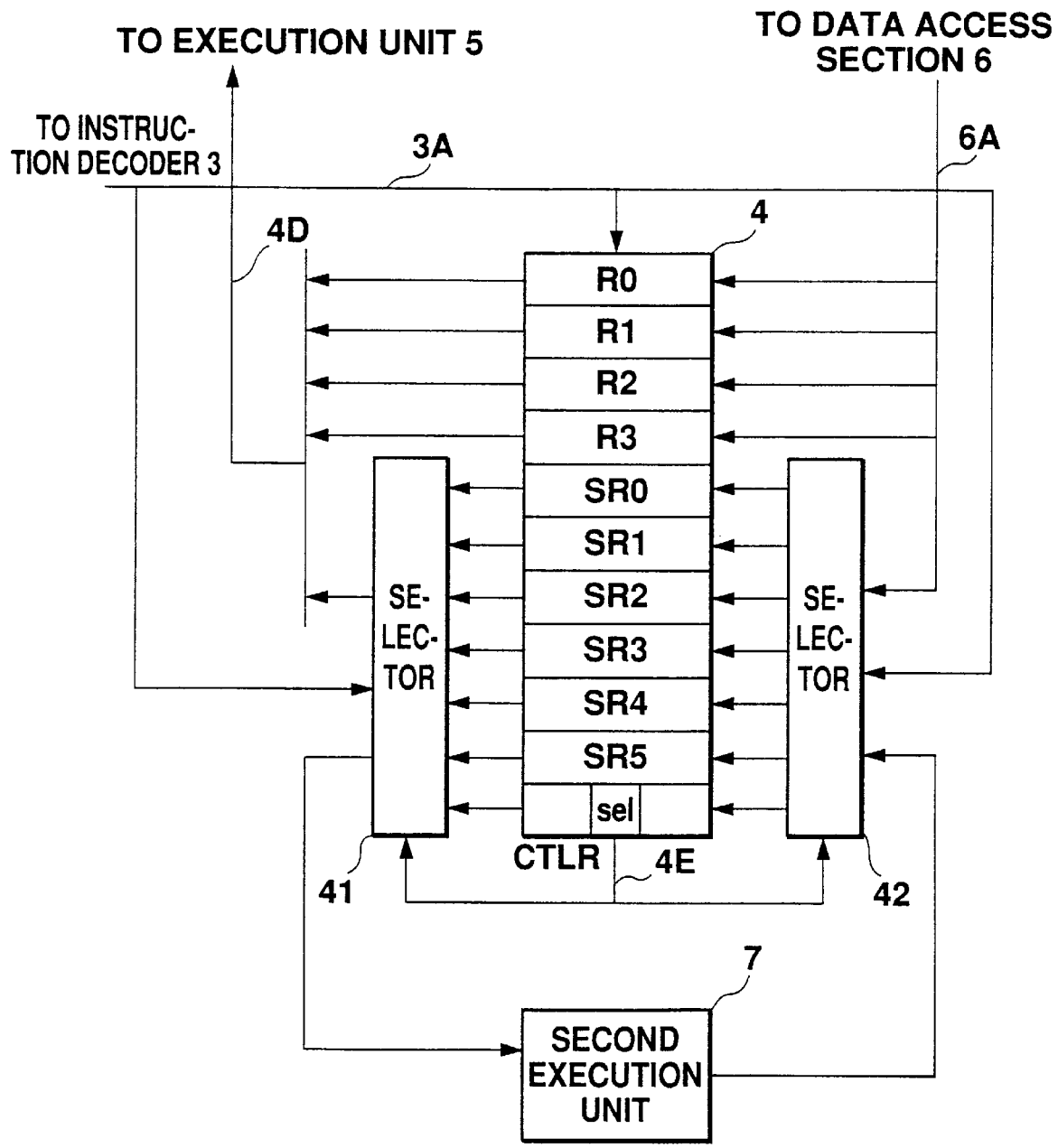
FIG. 10 is a view showing a register section 4 and a second execution unit 7 in a fourth embodiment.

The fourth embodiment will now be described. FIG. 10 is a view showing the connection between the register section 4 and the second execution unit 7. The other components are similar to those of the previously described embodiments.

The fourth embodiment includes six registers SR0–SR5 which are used as work registers for the second execution unit 7. These work registers are grouped into two selectable sets, one including the registers SR0–SR2 and the other including the registers SR3–SR5. The selection of the register set is carried out by selectors 41, 42 and a control register (CTLR), all of which are new components. Each of the selectors 41 and 42 is formed, for example, by a group of two-input and one-output selectors. The selection in the selectors 41 and 42 may be made through a 'sel' bit from the control register. If three or more register sets are used, a plurality of sel bits (sel fields) may be used to make the selection.

Where a register set to be selected has been previously designated by the control register, a control signal 4E is supplied from the control register to the selectors 41 and 42. Subsequently, the same processing procedure as in the first embodiment will be carried out through the selected register set.

According to the fourth embodiment, a register set different from the normal register set can be used, for example, to process an interruption without losing the desired execution result. Thus, the aforementioned problem 7 in the prior art can be solved by the fourth embodiment.

Fifth Embodiment

Figure 11:
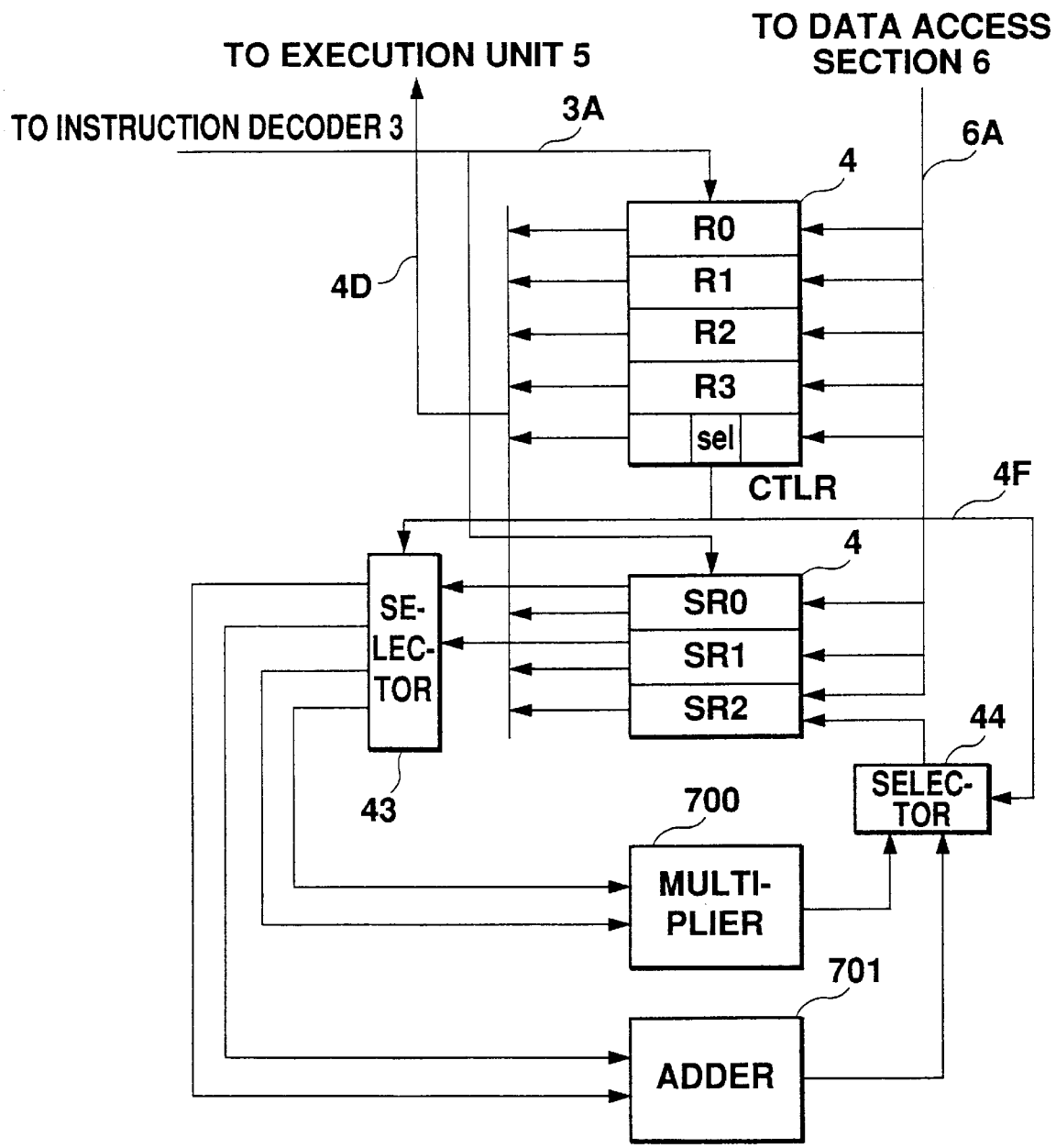
FIG. 11 is a view showing a register section 4 and a second execution unit 7 in a fifth embodiment.

FIG. 11 is a view showing the connection between the register section 4 and the second execution unit 7 in the fifth embodiment. The other features are similar to those of the previously described embodiments.

The fifth embodiment comprises two execution sub-units 700 and 701 in the second execution unit 7, one of which can be selectively used. For this purpose, the fifth embodiment also comprises selectors 43, 44 and a control register. The selectors are controlled by a 'sel' bit from the control register. Thus, a desired execution can be performed through a control signal 4F. If three or more sub-units are used, a plurality of sel bits (i.e., sel fields) may be preferably used.

Figure 2:
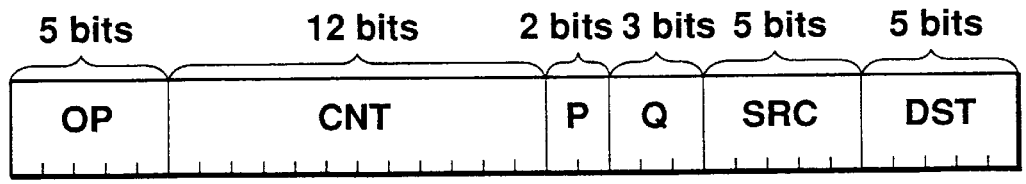
FIG. 2 is a field for specified instructions in the prior art DSP.

According to fifth embodiment, it is not required to increase the number of registers even if the number of sub-units is increased. Since the selection of execution is made by the control register, it is possible to specify a kind of execution without use of the OP field as shown in FIG. 2. Thus, the instruction code length can be compacted. Since the control register specifies the execution unlike the prior art wherein the execution should be specified by the instruction, this feature is also advantageous from the viewpoint of securing the extension in the future. Therefore, the fifth embodiment can overcome the aforementioned problems 3–5 in the prior art.

Sixth Embodiment

Figure 12:
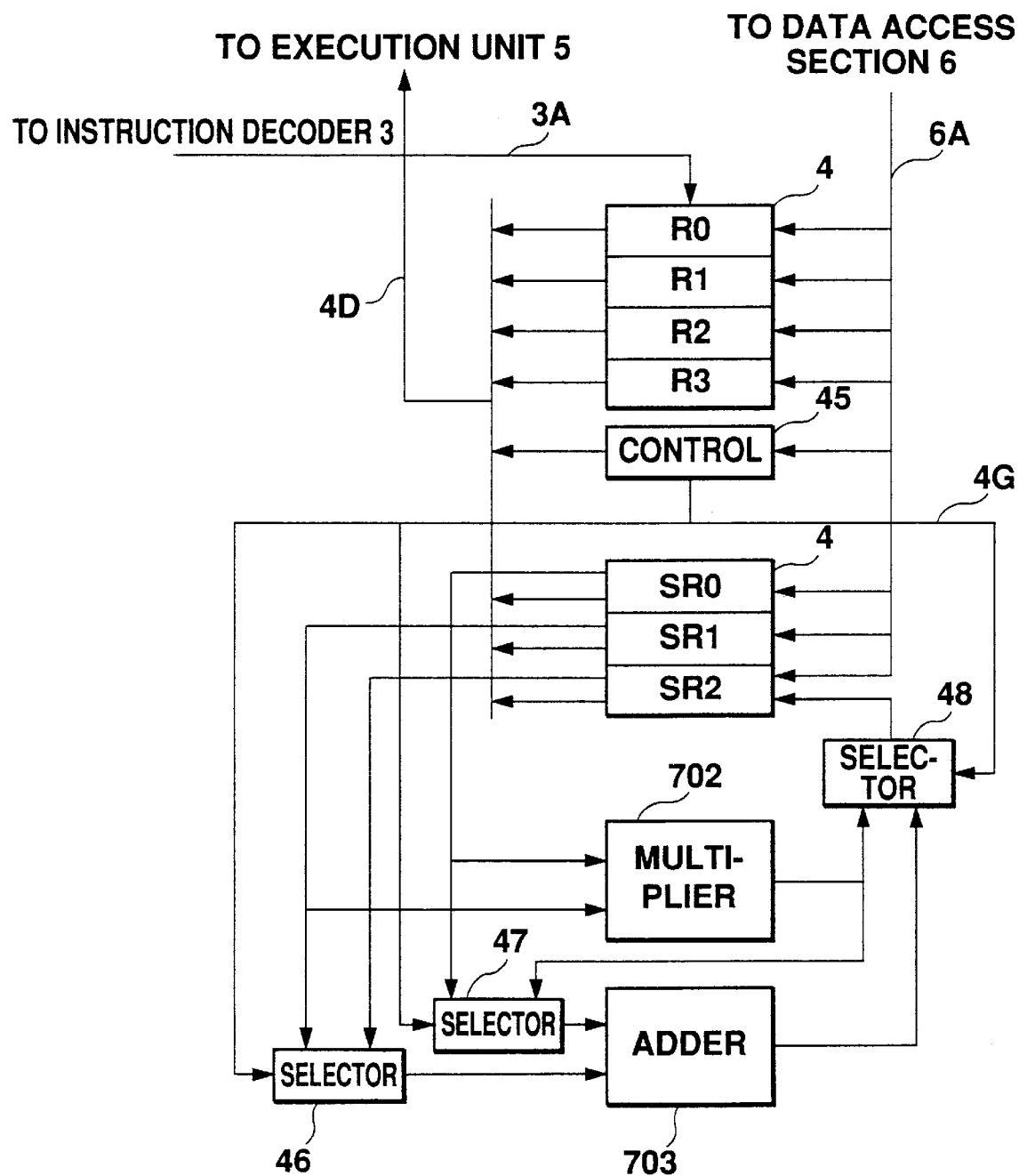
FIG. 12 is a view showing a register section 4 and a second execution unit 7 in a sixth embodiment.

FIG. 12 is a view showing the connection between the register section 4 and the second execution unit 7 in the sixth embodiment. The sixth embodiment comprises two sub-units, a multiplier 702 and an adder 703 in the second execution unit 7. The sixth embodiment also comprises selectors 46–48 and a control circuit 45 which function to select and use either of the selectors and which also function to use the selected selector in connection with the multiplier and adder. If one of these execution modes has been previously set in the control circuit 45, the corresponding one of the selectors 46–48 can be controlled by a control signal 4G.

1. When only multiplication is selected:

The multiplication is executed in response to a data transfer instruction for the registers SR0 and SR1. The output of the multiplier 702 is selected by the selector 48 and then written into the register SR2. The states of the selectors 46 and 47 may be arbitrary.

2. When only addition is selected

In response to a data transfer instruction for the registers SR0 and SR1, the registers SR1 and SR0 are respectively selected by the selectors 46 and 47 to execute the addition. The selector 48 selects the output of the adder 703, the execution result being then written into the register SR2.

3. When sum-of-products is selected

The register SR2 is cleared by loading zero and the register SR2 and the output of the multiplier 702 are selected by the selectors 46 and 47, respectively. When the data transfer instructions for the registers SR0 and SR1 are executed, the multiplication is first performed by the multiplier 702, the result being then written into the register SR2. The multiplied result is also inputted from the register SR2 to the adder 703 through the selector 46 and further inputted to the adder 703 through the other selector 47. As a result, the multiplied results from the registers SR0 and SR1 are added to the register SR2. Thereafter, the output of the adder 703 is selected by the selector 48, the added result being written into the register SR2.

This process will be repeated. The sum-of-products operation can be executed simply by continuously performing the load instructions for the registers SR0 and SR1. An example of the program will be described below. In this example, the products between the respective elements in two one-dimensional arrays that have been stored in the memory as pointers R0 and R1 are summed. The summation is done by a software loop. The result is obtained in the register SR2.

|     | MOV | SR2, 0      | (SR2 ← 0)                     |
|-----|-----|-------------|-------------------------------|
| L1: | LD  | SR0, (R0++) | (SR0 ← men(R0), R0 ← R0+1)    |
|     | LD  | SR1, (R1++) | (SR1 ← men(R1), R1 ← R1+1)    |
|     | CB  | R3, L1      | (jump to L1 when R3 is not zero) |

If the same procedure is performed by the RISC processor of the prior art, computation instructions such as addition (ADD), multiplication (MUL) and others are essentially required. However, the above example does not require any computation instruction. Therefore, the sixth embodiment can also overcome the aforementioned problems 1 and 2 in the prior art.

The embodiments of the present invention have been described as to a data processor which includes the second execution unit 7 having two-input type sub-units such as multiplier, adder and the like. However, each of the two-input type sub-units may be replaced by a one-input type sub-unit for inverse computation, trigonometric function, logarithmic function or the like. The computation may be started in response to a transfer instruction for one-input type register.

Although each of the embodiments has been described and illustrated as having general-purpose work registers (R0–R3) and the other registers (SR0–SR5) usable by the second execution unit 7 included in the same function block, the present invention may be applied to an LSI in which the registers R0–R3 are disposed in the same circuit block as the execution unit 5 and the other registers SR0–SR5 are disposed in the same circuit block as the second execution unit 7.

We claim:

1. A data processing apparatus for executing instructions to process data, comprising:

a first execution unit responsive to an operation instruction for starting a given execution;

a plurality of registers including input and output registers, each being accessible by a data transfer instruction;

a second execution unit for starting a given execution when data is transferred to the input register in response to a data transfer instruction executed by said first execution unit, the execution result data being then written into the output register; and a write suspend section for temporarily suspending the write of a subsequent execution result data into the output register until the data residing therein has been read out therefrom.

2. A data processing apparatus as defined in claim 1, further comprising a read suspend section for temporarily suspending readout of the execution result data from the output register until the execution result data has been written thereinto.

3. A data processing apparatus as defined in claim 1, further comprising an execution suspend section for temporarily suspending the second execution unit from starting the execution when the write is being suspended by the write suspend section and data is transferred to the input register.

4. A data processing apparatus as defined in claim 1, further comprising a transfer suspend section for temporarily suspending transfer of data to the input register through execution of a subsequent data transfer instruction when a valid data is held in the input register.

5. A data processing apparatus as defined in claim 1, further comprising a plurality of register sets formed from combinations of the input and output registers and designation sections for selecting a register set to be used in the execution from the plurality of register sets.

6. A data processing apparatus as defined in claim 1 wherein said second execution unit has a plurality of execution sub-units each performing a different execution, and further comprising a designation section for selecting an execution sub-unit to be activated from the plurality of execution sub-units when the data is transfer thereinto.

7. A data processing apparatus as defined in claim 6 wherein said designation section is a control register provided separately from said input and output registers.

8. A data processing apparatus as defined in claim 1 wherein said second execution unit includes a plurality of execution sub-units each performing a different execution, and the apparatus further comprising an input section for inputting the execution result data from one of the execution sub-units into another execution sub-unit;

input sections for inputting the data written in the output register into said another execution sub-unit;

and an input section for recursively inputting the execution result data of said another execution sub-unit into the output register.

9. A data processing apparatus as defined in claim 1, further comprising a plurality of said input registers;

a detection section for detecting a timing at which all data required by one execution are inputted into the input registers when the data are sequentially transferred to the plurality of said input registers; and an execution suspend section for temporarily suspending the second execution unit from starting the execution until all the data have been inputted into the input registers.

10. A data processing apparatus as defined in claim 8, further comprising

FIFO memories interposed between the input register and the second execution unit, said FIFO memories being operative to sequentially store the data transferred to the input register; and a control section for controlling readout of data from the FIFO memories.

11. A data processing apparatus as defined in claim 10 wherein said control section reads data from the FIFO memories when all the data necessary for the execution are inputted to the FIFO memories and wherein said execution suspend section permits the second execution unit to start the execution when the data have been read out from the FIFO memories.

12. A data processing apparatus, according to claim 1, wherein said second execution unit starts said given execution when a flag indicative of whether or not data exists in the input register is in a predetermined state indicating that the data exists in the input register.

13. A data processing apparatus, according to claim 1, wherein said second execution unit starts the given execution when the data is transferred into the input register based on information other than the data transfer instruction.

14. A data processing apparatus, according to claim 1, wherein said write suspend section refers to a flag indicative of whether or not the execution result data exists in the output register in order to suspend the write of a subsequent execution result data into the output register.

15. A data processing apparatus, according to claim 2, wherein said read suspend section refers to a flag indicative of whether or not the execution result data exists in the output register in order to suspend readout of the execution result data.

16. A data processing apparatus, according to claim 1, wherein said data is used in the given execution by the second execution unit.

17. A data processing apparatus as defined in claim 1, further comprising:

a plurality of said input registers;

a detection section for detecting that data has been transferred to a predetermined one or more of said input registers; and an execution suspend section for temporarily suspending the second execution unit from starting the execution until the data has been transferred to said predetermined one or more of said input registers.

* * * * *